United States Patent

Wang et al.

[11] Patent Number: 5,804,813
[45] Date of Patent: Sep. 8, 1998

[54] DIFFERENTIAL CONFOCAL MICROSCOPY

[75] Inventors: Jyh Pyng Wang; Chau-Hwang Lee, both of Taipei, Taiwan

[73] Assignee: National Science Council of Republic of China, Taipei, Taiwan

[21] Appl. No.: 659,647

[22] Filed: Jun. 6, 1996

[51] Int. Cl.⁶ .......................... G02B 21/00; G02B 21/06; G02B 21/26
[52] U.S. Cl. ...................... 250/201.3; 250/216; 250/234; 359/368; 359/389; 359/393
[58] Field of Search ..................... 250/234, 235, 250/216, 559.22, 559.38, 559.06, 559.09, 225, 201.3; 356/376; 359/368, 386, 396, 392, 389, 385

[56] References Cited

U.S. PATENT DOCUMENTS

| | | | |
|---|---|---|---|
| 4,845,356 | 7/1989 | Baker | 250/225 |
| 4,893,008 | 1/1990 | Horikawa | 250/234 |
| 5,557,113 | 9/1996 | Moorhouse et al. | 250/559.38 |
| 5,638,206 | 6/1997 | Sumiya et al. | 359/368 |

Primary Examiner—Edward P. Westin
Assistant Examiner—John R. Lee
Attorney, Agent, or Firm—Bacon & Thomas

[57] ABSTRACT

The linear slope range of the axial response curve of confocal imaging is utilized to obtain nanometer depth resolution, a sample which is at the top of a piezo-electric translator (PZT) 6, using a highly spatial-coherent light source, high numerical aperture focusing devices, a pinhole, and an optical detector to produce the axial response of confocal imaging Before the measurement, the calibration of height and resolution must be done by fitting the linear slope range of the axial response curve to a straight fitting line. While measuring surface profiles, the sample height is first finely adjusted to the linear slope range, and a two-dimensional scanning is then performed on the plane vertical to the detecting light beam. The signal of optical detector which represents the variation of the surface height, is then recorded. In this way, a three-dimensional image of the sample surface profile can be obtained with nanometer depth resolution. As the system does not require any feed-back control circuit to lock the position of the sample to be detected, it operates in open-loop and has the ability of real-time image display.

25 Claims, 3 Drawing Sheets

DIFFERENTIAL CONFOCAL MICROSCOPY

BACKGROUND OF THE INVENTION

1. Field of the Invention

The present invention utilizes the linear slope range of the axial response curve of confocal microscopy to obtain nanometer depth resolution.

2. Description of the Prior Art

The concept of confocal microscopy was introduced by Marvin Minsky in 1957, and received a U.S. patent in 1961. However, because there were no high-power spatial-coherent light sources at that time, confocal microscopy did not receive much attention and not many applications were developed. The invention of lasers began the development of confocal microscopy. Recently, confocal microscopy has been combined with the techniques of laser spectroscopy, such as laser-induced fluorescence, two-photon absorption, and Raman scattering, to be a useful tool in the research of biological tissues and the study of surface chemical properties.

The signal light of confocal microscopy comes mainly from the fluorescence, reflection, or scattered light at the focal point. The signal light is collected by a focusing device having a high numerical aperture and is detected by an optical detector. The light from outside the focal depth will be obstructed by the pinhole in front of the optical detector. Because the light outside the focal depth cannot be detected, confocal microscopy has the ability of depth discrimination. The intensity axial response curve of confocal microscopy is a $sinc^2$ curve, and the depth resolution is the full width at half maximum of this curve that approximately equals the confocal parameter of the focused light beam. In the visible spectral range, the confocal microscopy can provide a depth resolution of 0.3 micrometer, and the lateral resolution is limited by the diffraction limit of the laser beam, the highest value being about 0.2 micrometer.

Confocal microscopy combined with scanning mechanisms can provide a two-dimensional optical sectioning image. However, if a three-dimensional image is needed, it should be composed by several sectioning images of different axial positions. This process requires accurate control on the axial position of the sectioning image, as well as the time for image reconstruction. Therefore, conventional confocal microscopy does not have the ability of real-time three-dimensional imaging. Hence conventional confocal microscopy does not apply to detecting high-speed three-dimensional change of morphology and real-time monitoring of micro-processing.

The present invention is aimed at the limitation of conventional confocal microscopy in depth resolution and the lack of the ability of real-time three-dimensional imaging. The present invention provides a new concept of "differential confocal microscopy" to overcome the limitation of conventional confocal microscopy. The present invention can provide a depth resolution higher than 20 nanometers, and it operates in open-loop configuration which can increase the speed of imaging greatly, and hence has the ability of real-time three-dimensional imaging.

SUMMARY OF THE INVENTION

The present invention provides a new optical microscopy which utilizes the linear slope of the axial response curve of confocal microscopy to obtain the highest depth resolution. As mentioned above, the relationship between the signal intensity and the axial displacement of the sample is approximately a $sinc^2$ curve in confocal microscopy (please refer to FIG. 1). The maximum of this $sinc^2$ curve corresponds to the focal point of the detecting microscope objective lens. Although the signal is maximal at the focal point, the derivative of signal intensity versus the displacement of the sample is zero, that is, at this position, the confocal signal is not sensitive to the sample displacement. Especially when the signal light comes from the sample surface, placing the sample at the focal point cannot obtain high depth resolution. If we adjust the height of the sample such that its surface is in the linear slope region of the $sinc^2$ curve (as shown in the square of FIG. 1), the axial displacement of the sample causes a differential change in the signal intensity. In this region, the signal intensity is very sensitive to small changes in the surface height, and therefore the depth resolution can be greatly increased.

According to the above concept, the inventors have constructed a prototype of the differential confocal microscopy concept, which utilizes a light source having high spatial coherence and a high numerical aperture focusing device on focus the expanded light to the surface of the sample; and then uses an optical detector to detect the reflected light intensity from the sample surface. A pinhole in front of the detector is needed to create the axial response of confocal imaging, Before the measurement, it is necessary to finely adjust the height of the sample to the linear slope region of the confocal axial response curve, and then proceed with two-dimensional scanning and recording of the signal of the optical detector. In this way, a three-dimensional image of the sample surface with nanometer accuracy can be obtained The lateral resolution of the present invention is determined by the diffraction limit of the laser beam and the depth resolution reaches the limit of system noise.

Because the system does not require any feed-back control circuits to lock the position of the sample to be detected, it operates in open-loop and has the ability of real-time image display.

DETAIL DESCRIPTION OF THE PREFERRED EMBODIMENT

Figure 2:
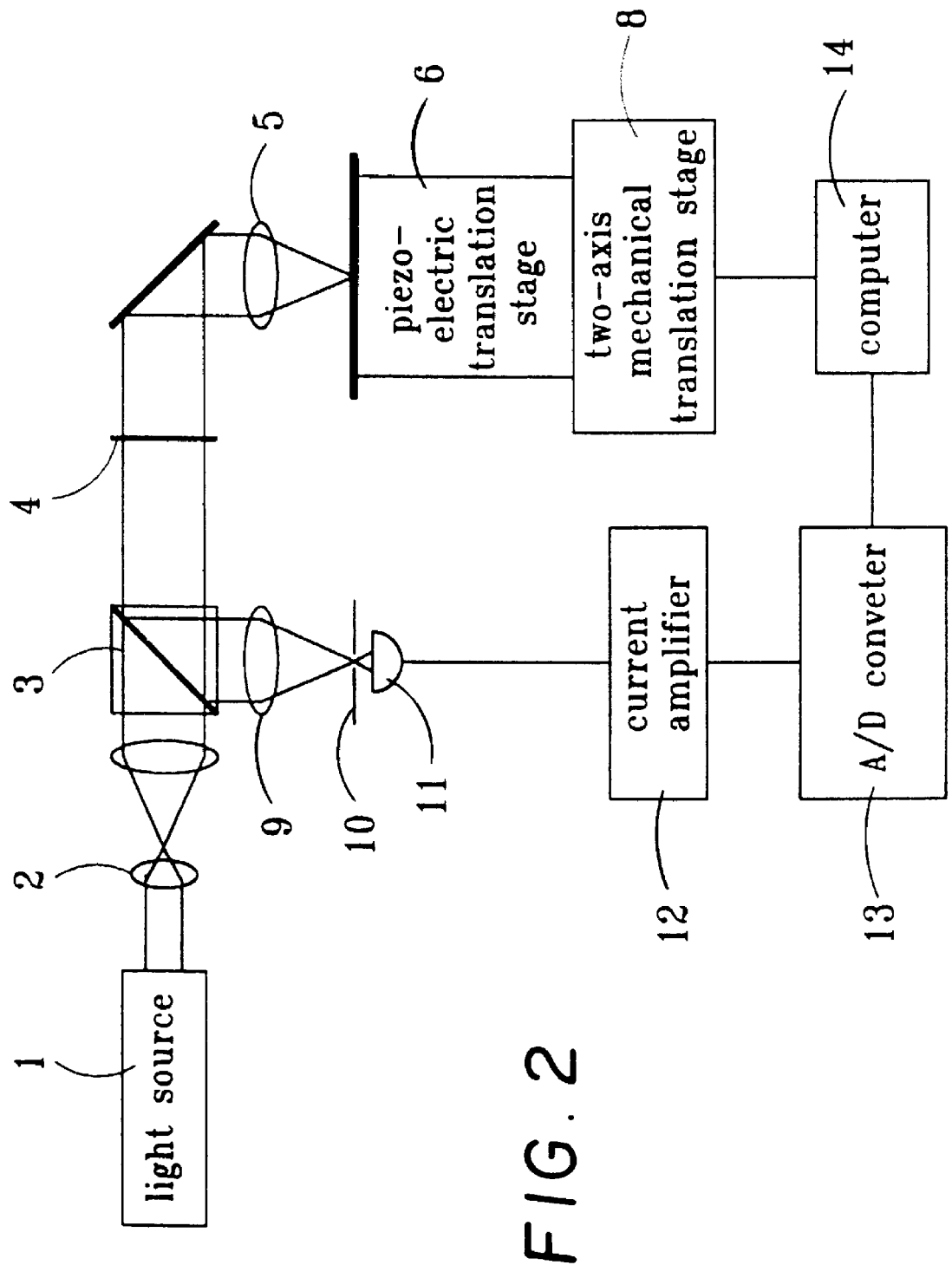
FIG. 2 is a schematic diagram of a preferred embodiment of the present invention.

FIG. 2 shows a preferred embodiment of "differential confocal microscopy" according to the present invention, in which the light source 1 emits the beam through a beam expander 2, and then the beam is focused by the focusing device 5 onto a sample which is at the top of a piezo-electric translator (PZT) 6. The beam expansion makes the ratio between the diameter of the expanded beam and the focal length close to the numerical aperture of the focusing device. The purpose is to reduce the confocal parameter of the focused beam in order to increase the depth resolution. At the same time, the size of the focused light spot is also reduced to achieve higher lateral resolution. The sample is put on the PZT6, and the PZT6 is set up on computer-controlled two-axis mechanical translation stages 8. Before performing the measurement, adjust the distance between the sample and the focusing device 5 is adjusted to the focal length of the focusing device by maximizing the detected signal; and the PZT 6 is adjusted to move the sample to the linear slope region of the axial response curve of confocal microscopy, which is the working range of the present "differential confocal microscopy" of the present invention. The two-axis mechanical translation stage 8 is for two dimensional scanning of the sample in the plane transverse to the propagation direction of the light beam, and may alternatively be in the form of piezo-electric translation stages, electromagnetic translation stages. Still further scanning may be achieved by using acousto-optic or electro-optic modulators, or rotational or vibrational optical scanners which may use reflective mirrors, refractive lenses, prisms, or diffraction devices such as gratings to change the direction of the beam relative to the surface.

The present invention uses a He-Ne laser as the light source, and the focusing device is a microscope objective lens. Because the feedback light will interfere with the light inside the He-Ne laser cavity, a polarization beam splitter 3 with a quarter wave plate 4 are used in the optical path to eliminate the interference, although feedback could be provided by the light source itself if the light source is affected by the confocal feedback light and changes its own characteristics in direct proportion to feedback light intensity. The reflected light from the sample surface goes through the polarization beam splitter 3 and is almost completely reflected to an optical detector 11, which can use photodiodes, avalanche photodiodes, photo multipliers, charge coupled devices (CCDs), or fluorescent screens; where it passes the spatial filter which is composed by another focusing device 9 and a pinhole 10 in order to filter out the light outside the focal depth and to produce the confocal imaging, The signal is detected by the optical detector 11 and then amplified by a signal amplifier 12. The amplified signal is recorded by an analog-to-digital converter 13, and then stored by a computer 14. The computer 14 generates the three-dimensional image by using the intensity of the signal combined with the coordinate from the two-axis mechanical translation stages 8.

Figure 1:
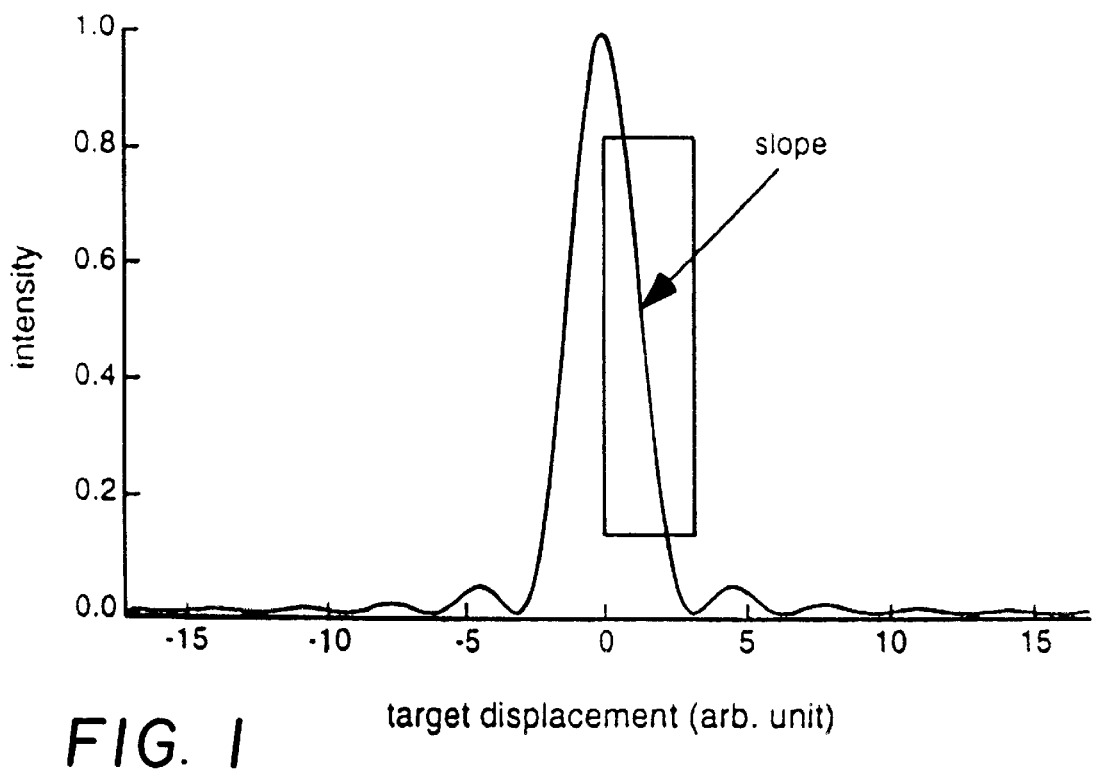
FIG. 1 is a graph of the relationship between the signal intensity and the axial displacement of a sample in confocal microscopy (the square indicates the linear slope region)
Figure 3:
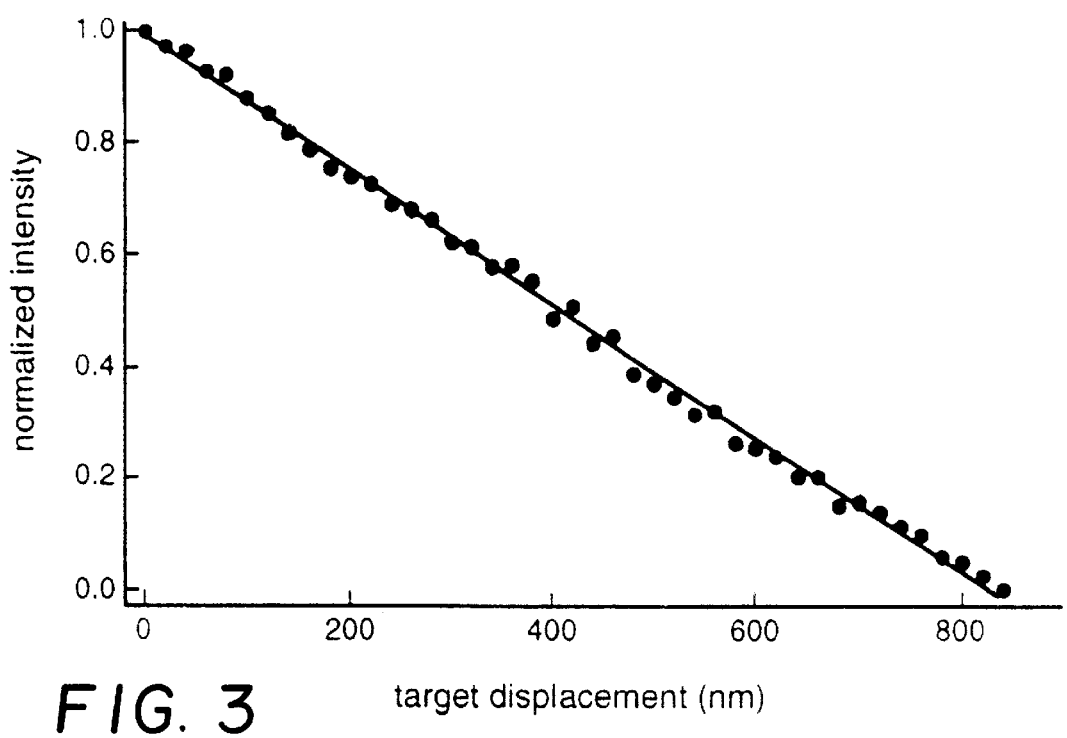
FIG. 3 is a graph of the change in signal intensity versus the sample displacement when using a numerical aperture 0.85 microscope objective lens as the detecting focusing device (the solid cycle is the value of the signal, and the solid line is the linear fitting curve)

Before the measurement it is necessary to use the same sample to calibrate the relationship between the variation of signal intensity and the height of the sample. This is done by using a calibrated piezo-electric translator 6 to finely adjust the height of the sample, and recording the signal of the optical detector 11 at the same time. As shown in the FIG. 3, in the linear working range, the measured signal value can be fitted with a straight line, with the slope r of the fitted straight line and the value of the root-mean-square error $\Delta E$ between the fitted and measured values being recorded. When measuring the height of the sample surface, the obtained signal intensity divided by the slope r is the relative value of height. The deviation of height $\Delta E/r$ is the depth resolution. Because different samples have different reflectivities, every sample has to have its own fitted straight line calibrated before measuring. With this fitted straight line the verification of the height calibration and the resolution can be completed. For example, in FIG. 3, when using a numerical aperture 0.85 objective lens as the focusing device, the dynamic range exceeds 800 nanometers, and the depth resolution is 14 nanometers. The lateral resolution is the size of the focused spot. For example, if the light source is a red He-Ne laser, the smallest spot size is approximately 0.5 micrometer. The present invention "differential confocal microscopy" can use any light sources with high spatial coherence. If a shorter-wavelength light source such as a He-Cd laser (wavelength 325 nanometers) is used, higher depth resolution and lateral resolution can be obtained.

The dynamic range of differential confocal microscopy is determined by the numerical aperture of the focusing device. The lower the numerical aperture, the greater the dynamic range. However, the depth and lateral resolution will also be decreased. For example, in the prototype system of present invention, if a numerical aperture 0.4 objective lens is used as the focusing device, the dynamic range can be 10 micrometers, but the depth resolution changes to 80 nanometers, and the lateral resolution will be approximately 1.2 micrometer. The focusing device can use the objective lenses of a microscope, the output aperture of a single-mode optical fiber, Fresnel zone plates.

Figure 4:
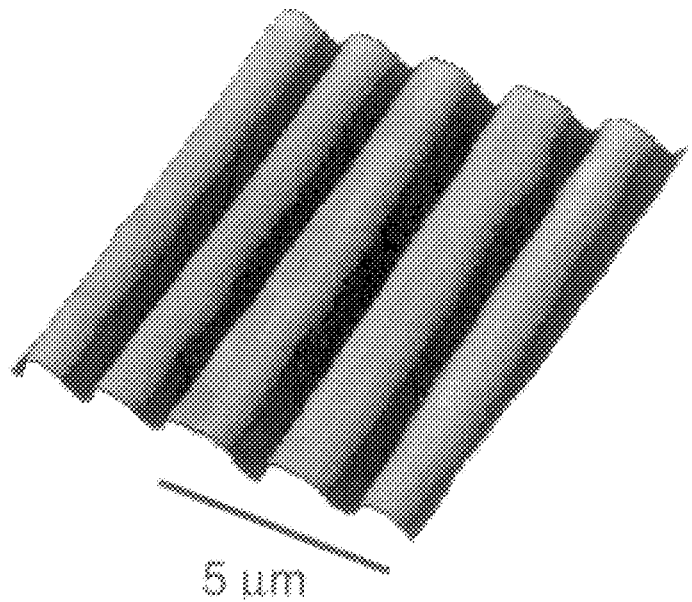
FIG. 4 is a three-dimensional image of an optical grating obtained with the present invention (the height of optical grating is from 130 nanometers to 170 nanometers)
Figure 5:
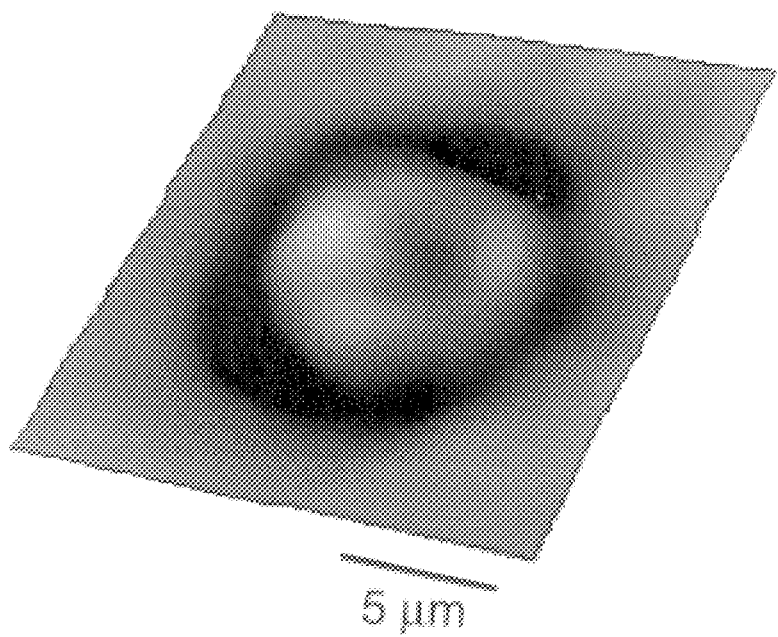
FIG. 5 is a three dimensional image of a human erythrocyte surface (the central recess is approximately 570 nanometers).

FIG. 4 and FIG. 5 are three-dimensional images obtained from the prototype system of the present invention. FIG. 4 is a three-dimension image of an optical grating. This optical grating is an etched gold film coated on a quartz plate. The thickness of the gold film is approximate 200 nanometer. The measured height of the optical grating is from 130 nanometer to 170 nanometer. FIG. 5 is a three-dimensional image of a human erythrocyte surface and the central recess is approximately 570 nanometers.

Many changes and modifications in the above described embodiment of the invention can, of course, be carried out without departing from the scope thereof. Accordingly, to promote the progress in science and the useful arts, an embodiment of the invention is disclosed in detail, but the scope of the invention is intended to be limited only by the scope of the appended claims.

What is claimed is:

1. A differential confocal microscopy system, comprising:

a light source;

beam expander means for expanding a diameter of a beam emitted by the light source;

focusing means including a high numerical aperture focusing device for focusing the expanded beam on a sample;

scanning means for varying a position of the focused light beam on the sample in a plane transverse relative to a direction of propagation of the light beam incident on said surface in order to cause said light beam to scan the sample;

optical signal generating means for generating an optical signal proportional to an intensity of light reflected from the sample surface;

pin hole means for filtering from the optical signal light outside a focal depth and thereby produce confocal imaging;

detector means for detecting said optical signal and providing said signal to a computer to generate a three-dimensional confocal image based on the intensity of light reflected from the sample surface, which is proportional to a distance of the focusing device from the surface, and on coordinates of the light beam in said two dimensional plane;

means for calibrating said system, said calibration means including means for varying a height of the sample relative to the focusing device and generating a plot of height versus intensity; and means for positioning the sample so that said height is within a linear portion of said plot such that the signal variation is directly proportional to the height variation of the sample surface.

2. A differential confocal microscopy system as claimed in claim 1, wherein said calibration means further comprises means for fitting a straight line to said plot, recording a slope r of the straight line and the root-mean-square error ΔE of a deviation between said plot and said straight line, and when scanning said sample, dividing the signal intensity by r to obtain a value of the height having a depth resolution of ΔE/r.

3. A differential confocal microscopy system as claimed in claim 1, wherein the height varying means comprises a translation device arranged to manipulate the distance between the focusing device and the surface with high accuracy and linearity. The translation device including a piezoelectric translation device on which the sample is placed.

4. A differential confocal microscopy system as claimed in claim 1, wherein said optical signal generating means comprises a beam splitter and a quarter wave plate placed in a path of said reflected light to direct said reflected light through the pin hole means to said detector means.

5. A differential confocal microscopy system as claimed in claim 4, wherein said pin hole means is a pin hole.

6. A differential confocal microscopy system as claimed in claim 1, wherein said detector means includes an optical detector, means for amplifying an output of the optical detector, and an analog-to-digital converter.

7. A differential confocal microscopy system as claimed in claim 1, wherein said detector means includes an optical detector, said optical detector being selected from the group consisting of photodiodes, avalanche photodiodes, photomultipliers, charge coupled devices, and fluorescent screens.

8. A differential confocal microscopy system as claimed in claim 1, wherein the high numerical aperture focusing device includes objective lenses of a microscope.

9. A differential confocal microscopy system as claimed in claim 1, wherein the high numerical aperture focusing device includes an output aperture of a single-mode optical fiber.

10. A differential confocal microscopy system as claimed in claim 1, wherein the high numerical aperture focusing device includes Fresnel zone plates.

11. A differential confocal microscopy system as claimed in claim 1, wherein the high numerical aperture focusing device includes graded index (GRIN) lenses.

12. A differential confocal microscopy system as claimed in claim 1, wherein said detection means is arranged to detect light from said light source, said light from said light source being affected by the reflected light to cause a change in its own characteristics which is directly proportional to reflected light intensity.

13. A differential confocal microscopy system as claimed in claim 1, wherein said scanning means comprises a two-axis mechanical translation stage arranged to displace the sample in two-dimensions within said plane.

14. A differential confocal microscopy system as claimed in claim 1, wherein said scanning means comprises means selected from the group consisting of piezo-electric and electromagnetic translation stages for displacing the sample in two-dimensions within said plane.

15. A differential confocal microscopy system as claimed in claim 1, wherein said scanning means comprises means selected from the group consisting of acousto-optic and electro-optic modulators for varying a position of incidence of light from said focusing device on said surface.

16. A differential confocal microscopy system as claimed in claim 1, wherein said scanning means comprises means selected from the group consisting of rotational and vibrational optical scanners for varying a position of incidence of light from said focusing device on said surface, said rotational and vibrational optical scanners including light deflecting elements selected from the group consisting of reflective mirrors, refractive lenses, prisms, optical gratings, and diffraction devices other than optical gratings.

17. A differential confocal microscopy system as claimed in claim 1, wherein the height varying means comprises a translation device arranged to manipulate the distance between the focusing device and the surface with high accuracy and linearity, the translation device including a piezoelectric translation device on which the focusing device is mounted.

18. A differential confocal microscopy method, comprising the steps of:

focusing by means of a high numerical aperture focusing device an expanded light beam on a surface of a sample;

measuring an intensity of light reflected from the surface;

changing a position at which light from the focusing device is incident on the surface in order to scan the surface in a plane transverse to a direction of propagation of the light beam incident on said surface;

generating an optical signal proportional to an intensity of light reflected from the sample surface;

filtering from the optical signal light outside a focal depth and thereby produce confocal imaging;

detecting said optical signal and providing said signal to a computer to generate a three-dimensional confocal image based on the intensity of light reflected from the sample surface, which is proportional to a distance of the focusing device from the surface, and on coordinates of the light beam in said two dimensional plane;

varying a height of the sample relative to the focusing device and generating a plot of height versus intensity; and positioning the sample so that said height is within a linear portion of said plot such that the signal variation is directly proportional to the height variation of the sample surface.

19. A differential confocal microscopy method as claimed in claim 18, further comprising the steps of fitting a straight line to said plot, recording a slope r of the straight line and the root-mean-square error ΔE of a deviation between said plot and said straight line, and when scanning said sample, dividing the signal intensity by r to obtain a value of the height having a depth resolution of ΔE/r.

20. A differential confocal microscopy method as claimed in claim 18, wherein the step of generating the optical signal comprises the step of placing a beam splitter and a quarter wave plate placed in a path of said reflected light to direct said reflected light to an optical detector.

21. A differential confocal microscopy method as claimed in claim 20, wherein the step of directing the reflected light to an optical detector comprises the step of directing the reflected light through a pin hole to filter from the optical signal light outside the focal depth and thereby produce said confocal imaging.

22. A differential confocal microscopy method as claimed in claim 18, further comprising the steps of amplifying a detected optical signal and converting said detected and amplified optical signal to digital form.

23. A differential confocal microscopy method as claimed in claim 18, wherein the step of generating said optical signal comprises the step of detecting light directly from said light source, said light from said light source being affected by the reflected light to cause a change in its own characteristics which is directly proportional to reflected light intensity.

24. A differential confocal microscopy method as claimed in claim 18, wherein said step of scanning comprises the step of translating the sample relative to the focusing device.

25. A differential confocal microscopy method as claimed in claim 18, wherein said step of scanning comprises the step of changing a direction of the light beam incident on the sample.

* * * * *